United States Patent [19]
Holmes et al.

[11] Patent Number: 5,249,357
[45] Date of Patent: Oct. 5, 1993

[54] METHOD OF FABRICATING A ROCKET ENGINE COMBUSTION CHAMBER

[75] Inventors: Richard R. Holmes, Guntersville; Timothy N. McKechnie, Huntsville; Christopher A. Power, Guntersville; Ronald L. Daniel, Jr., Huntsville, all of Ala.; Robert M. Saxelby, Santa Susana, Calif.

[73] Assignee: The United States of America as represented by the Administrator of the National Aeronautics and Space Administration, Washington, D.C.

[21] Appl. No.: 9,908

[22] Filed: Jan. 27, 1993

[51] Int. Cl.5 .............................................. B23P 15/00
[52] U.S. Cl. .................................. 29/890.01; 427/236; 427/270; 427/455
[58] Field of Search .............. 29/890.01, 527.2, 527.4, 29/530; 427/455, 236, 270

[56] References Cited

U.S. PATENT DOCUMENTS

| | | | |
|---|---|---|---|
| 4,230,749 | 10/1980 | Patel | 427/455 |
| 4,328,257 | 5/1982 | Muehlberger et al. | 427/455 |
| 4,582,678 | 4/1986 | Niino et al. | 29/890.01 |
| 4,584,171 | 4/1986 | Niino et al. | 29/890.01 |
| 4,856,163 | 8/1989 | Horiuchi et al. | 29/890.01 |
| 4,905,886 | 3/1990 | Kennedy et al. | 427/455 |
| 4,942,653 | 7/1990 | Hawkinson | 29/890.01 |
| 5,070,228 | 12/1991 | Siemers et al. | 427/455 |
| 5,070,591 | 12/1991 | Quick et al. | 29/527.4 |
| 5,075,966 | 12/1991 | Mantkowski | 29/890.01 |
| 5,154,352 | 10/1992 | Buckreus | 29/890.01 |

*Primary Examiner*—Irene Coda
*Attorney, Agent, or Firm*—Robert L. Broad, Jr.; John R. Manning; Guy M. Miller

[57] ABSTRACT

A process for making a combustion chamber for a rocket engine wherein a copper alloy in particle form is injected into a stream of heated carrier gas in plasma form which is then projected onto the inner surface of a hollow metal jacket having the configuration of a rocket engine combustion chamber. The particles are in the plasma stream for a sufficient length of time to heat the particles to a temperature such that the particles will flatten and adhere to previously deposited particles but will not spatter or vaporize. After a layer is formed, cooling channels are cut in the layer, than the channels are filled with a temporary filler and another layer of particles is deposited.

8 Claims, 3 Drawing Sheets

METHOD OF FABRICATING A ROCKET ENGINE COMBUSTION CHAMBER

ORIGIN OF THE INVENTION

The invention described herein was made in the performance of work under a NASA contract and is subject to the provisions of Section 305 of the National Aeronautics and Space Act of 1958, Public Law 86-568(72 Stat. 435; 42 U.S.C. 2457)

BACKGROUND OF THE INVENTION

1. Field of the Invention

This invention relates to methods of making liquid rocket engine combustion chambers.

2. Prior art

It is known to make a rocket engine combustion chamber by casting a liner and then forging it into the desired hourglass shape. Cooling channels are then cut in the outer surface of the liner, followed by filling the cooling channels with wax. A thin layer of copper is then electrodeposited over the filled channels and a thicker layer of nickel is electrodeposited over the copper layer. The wax is then removed from the channels to leave them clear and a multi-part clamshell jacket is fitted around the liner and the entire assembly is welded together to form a combustion chamber.

A major disadvantage of this process is that there are numerous welds which cannot be inspected. Failure of one of the welds can result in a catastrophic failure of a space shuttle being lifted into orbit by the rocket motor.

Another disadvantage of this conventional process is that it is very expensive and time consuming, the electrodeposition of the copper and nickel layers alone requiring thousands of man hours and great expense.

SUMMARY OF THE INVENTION

A process for making a combustion chamber for a rocket engine wherein a copper alloy in particle form is injected into a stream of a heated carrier gas in plasma form which is projected onto the inner surface of a cast, hollow metal jacket having the configuration of a rocket engine combustion chamber. The particles are in the plasma stream for a sufficient length of time to heat the particles to a temperature such that the particles will flatten and adhere to previously deposited particles but will not spatter or vaporize. After a layer of the alloy has been built up, cooling channels are cut in the layer. The cooling channels are filled with a filler material and a second layer of alloy is then applied to cover the cooling channels. The filler material is then removed from the cooling channels to leave open cooling channels through which a cooling liquid can be circulated.

DETAILED DESCRIPTION OF THE INVENTION

Figure 1:
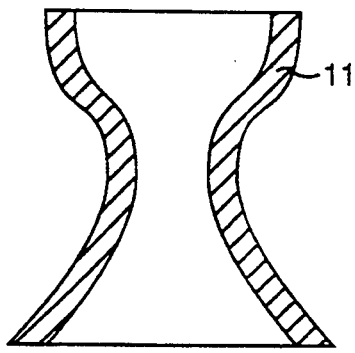
FIG. 1 is a cross sectional view of a cast metal jacket which serves as a form for making the combustion chamber.

Referring now in detail to the drawings, there is shown in FIG. 1 a one-piece, cast metal jacket 11 inside of which a liner is to be formed to make the combustion chamber for a liquid rocket engine. The jacket 11 is cast from a suitable metal, with the preferred metal being one of several alloys, Inconel 718, stainless steel 347 or JBK-75. These alloys have the following compositions:

|  | Inconel 718 | Stainless 347 | JBK-75 |
|---|---|---|---|
| nickel | 50–55% | 9–13% | 29–31% |
| chromium | 17–21% | 17–19% | 14–16% |
| niobium + tantalum | 4.75–5.5% | 0.8% | 0% |
| molybdenum | 2.8–3.3% | 0% | 1–1.5% |
| titanium | 0.85–1.15% | 0% | 2.1–2.5% |
| aluminum | 0.2–0.8 | 0% | 0.1–0.35% |
| iron | balance | balance | balance |

While the above alloys are preferred, other metals and alloys can be used provided that the metal or alloy can withstand the high temperatures encountered in vacuum plasma spraying (described below) and has properties suitable for use in a liquid rocket combustion chamber.

Figure 2:
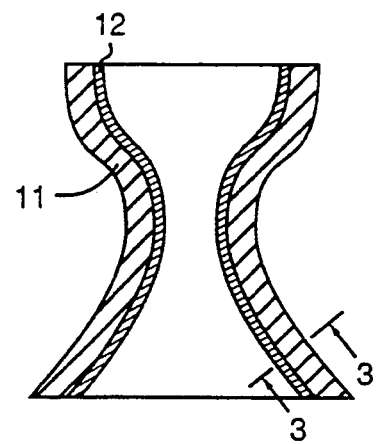
FIG. 2 is a cross sectional view of the jacket of FIG. 1 after a first layer of an alloy liner has been applied to the inner surface of the jacket.

FIG. 2 shows the jacket of FIG. 1 after a layer of a copper alloy forming a liner 12 has been applied to the inner surface of the jacket. This liner is applied by a vacuum plasma spray system wherein an alloy in particle form is heated and projected at a high velocity into impact with the inner surface of the jacket 11 under vacuum or low pressure conditions, i.e., 40 to 200 torr.

Figure 6:
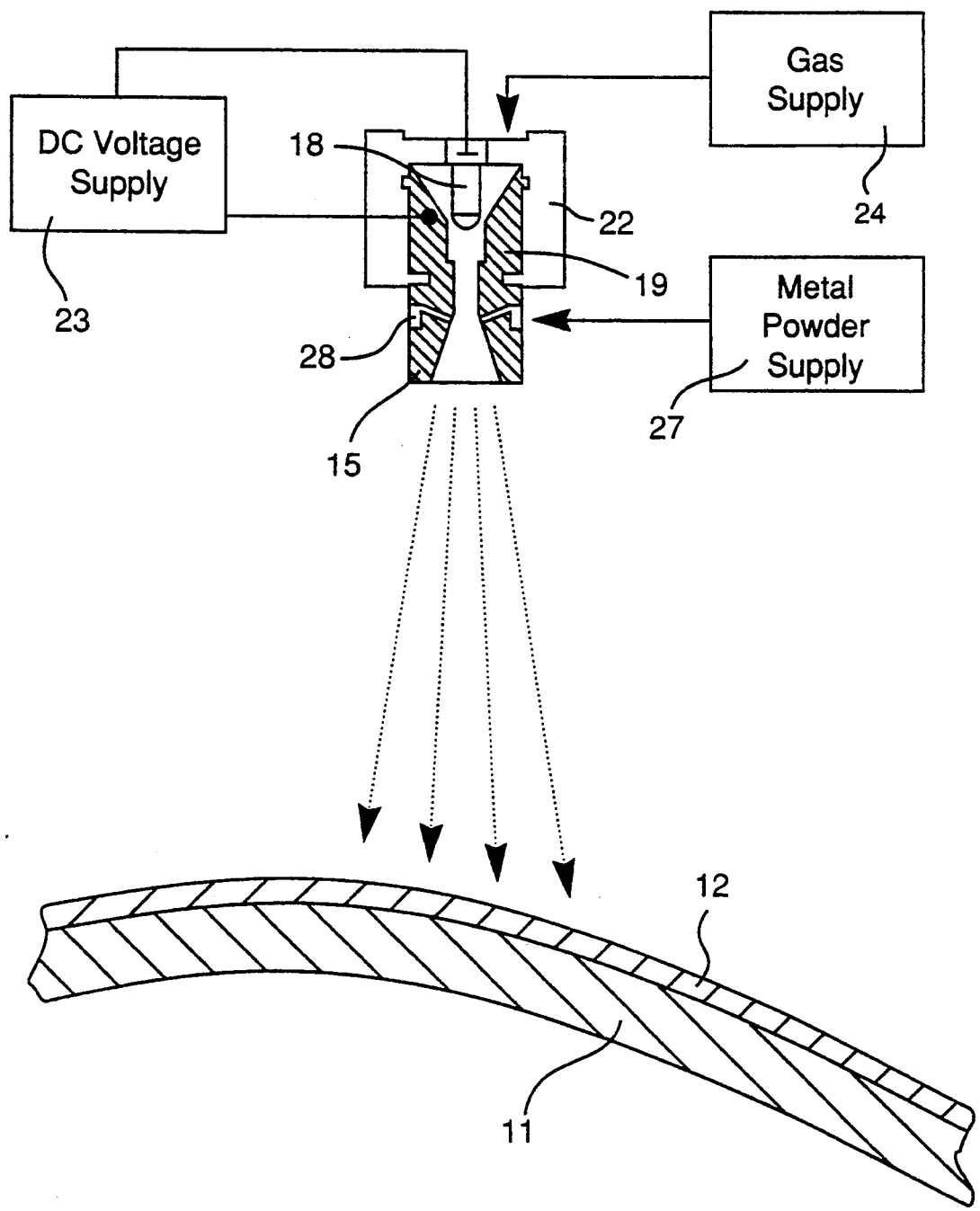
FIG. 6 is an enlarged fragmentary view showing the vacuum plasma spray nozzle positioned to spray the heated alloy particles onto the inner surface of the jacket.

FIG. 6 shows a cross sectional view of the spray head 15 used to form the liner 12. The head 15 includes a tungsten cathode 18 and a copper anode 19, the anode 19 being surrounded by a water jacket 22 for cooling the anode. A DC voltage of 40 to 70 volts from a supply 23 is applied across the cathode and anode to cause a current flow of 800 to 1,200 amps between the cathode and the anode.

A carrier gas of about 80%–100% argon and up to 20% helium or hydrogen from a supply 24 is passed through the head 15 and toward the jacket 11 at a velocity of Mach 2 to Mach 3. A metal alloy in powder form from a supply 27 is injected through ports 28 into the gas stream. The DC current flowing in the form of an arc from the cathode 18 to the anode 19 heats the gas to a high temperature, i.e., 5,000 to 20,000 Kelvin and ionizes it to form a plasma.

The metal alloy is preferably an alloy of 3.2 to 3.7 weight percent silver with the balance being copper or an alloy of 2.75 to 3.25 weight percent silver, 0.3 to 0.7 weight percent zirconium with the balance being copper. The alloy is in powder form with a particle diameter within the range of 5 to 45 microns.

The head 15 is positioned at a distance from the surface being sprayed such that the powder is in the heated gas stream for a time sufficient to heat the powder particles to a high enough temperature that the particles will flatten and adhere to previously deposited particles. However, the temperature of the plasma and time period that the particles are in the plasma should not be great enough that the particles are melted to the point where they spatter when they strike the surface of the jacket.

Figure 7:
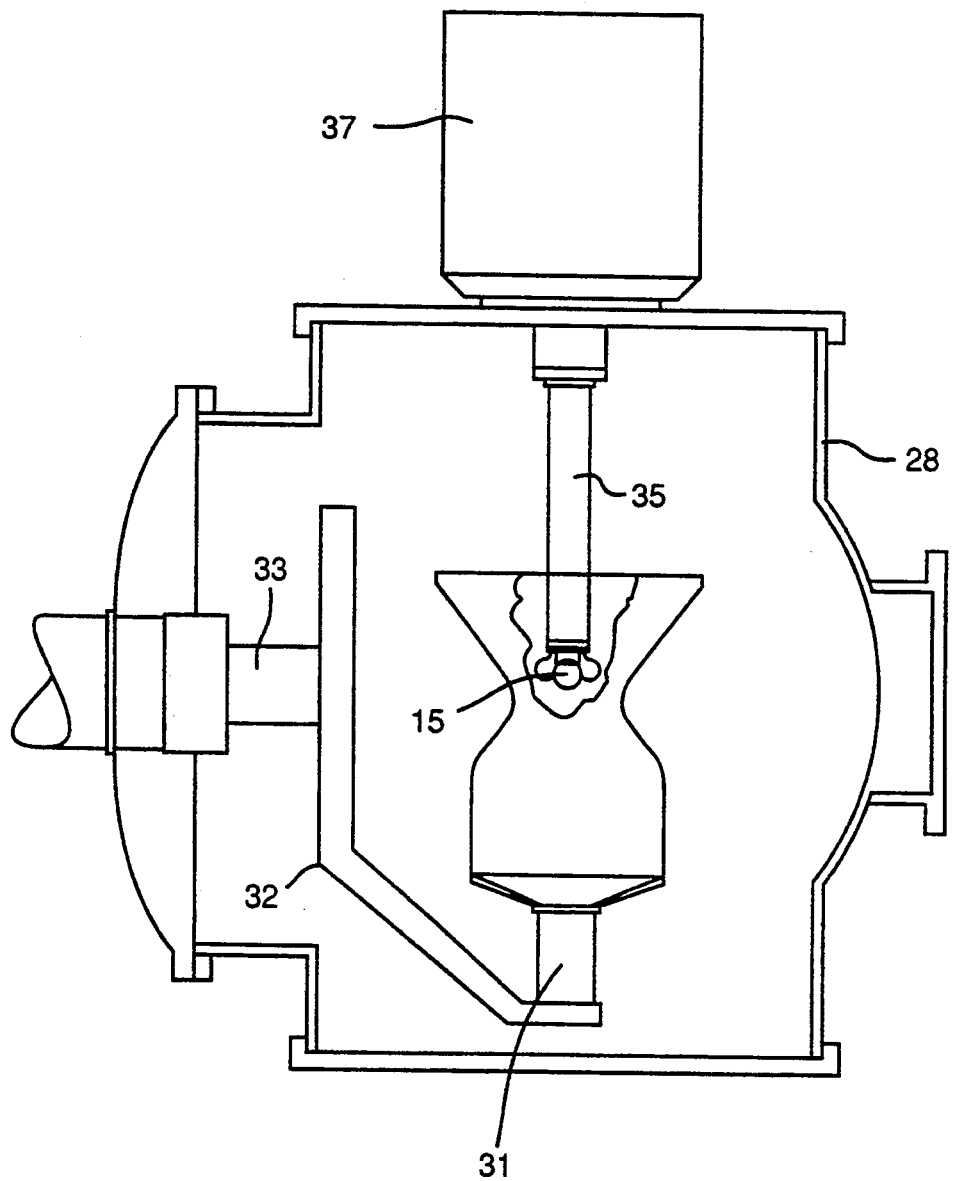
FIG. 7 is a schematic view showing the structure used with the vacuum plasma spray nozzle to form the combustion chamber.

FIG. 7 schematically shows apparatus used with the spray head 15. The jacket 11 is supported inside a vacuum chamber 28 by a spindle 31 secured to an arm 32 mounted on a shaft 33 which extends through the wall of the chamber 28. The spindle 31 may be rotated to rotate the jacket 11 and the shaft 33 can be turned to pivot the jacket 11.

The spray head 15 is mounted on the end of a control arm 35 operated by a motion control unit 37-. attached to the top of the vacuum chamber 28. The arm 35 can be manipulated by the control unit 37 to traverse the spray head 15 around the inner surface of the jacket 11. The arm can also be moved toward or away from the control unit 37 to move the spray head 15 in a direction parallel to the surface of the jacket 15. Also, the arm 32 can be traversed about an axis perpendicular to the axis of the arm to vary the distance of the spray head 15 from the inner surface of the jacket 11. The control unit 37, which is a known piece of equipment, is not a part of this invention.

Figure 3:
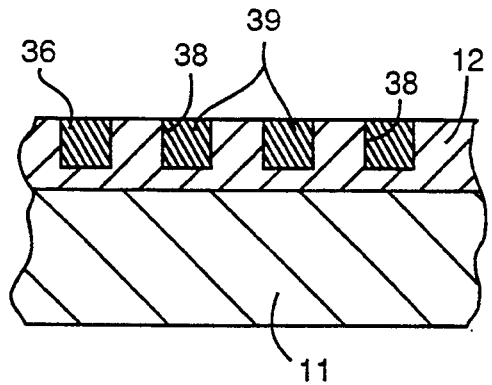
FIG. 3 is an enlarged fragmentary view taken on line 3—3 of FIG. 2 showing cooling channels which have been cut in the first layer of the alloy liner and then filled with a filler material.
Figure 4:
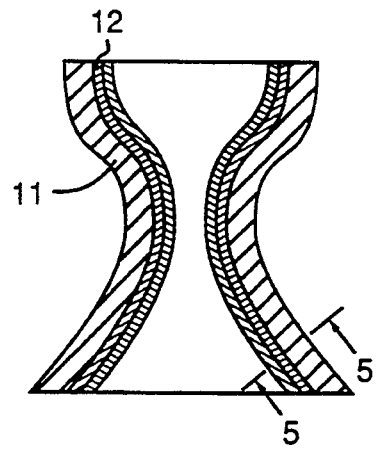
FIG. 4 is a cross sectional view of the apparatus of FIG. 2 after a second layer of alloy liner has been applied.

After the liner has been formed to a depth of 0.6 to 1.5 cm, the jacket 11 with its liner 12 are removed from the vacuum chamber 28 and allowed to cool. Cooling slots 38 (FIG. 3) are then cut with a slotting saw into the inner surface of the liner 12 in a known manner. In the completed combustion chamber liquid hydrogen will flow through these slots to cool the combustion chamber and prevent it from reaching temperatures which would damage or destroy it. These slots are best shown in FIG. 3, where the slots are shown filled with a filling material 39.

The purpose of the filling material is to allow the slots 38 to be opened by removal of the material after the chamber is completed. The material may be any material which can withstand a spraying operation such as described above and which can be dissolved out of the slots 38 by the use of water, acids, etc. Some examples of filler material are aluminum, mild steel, titanium, lithium flouride, calcium chloride, ceramics and other salts. If a metal such as mild steel is to be used as the filler material, a mild steel rod having a cross sectional configuration and a contour to fit into the slot 38 will be used. The slot will be cut with a slotting saw and the mild steel rod will be placed in the slot.

Figure 5:
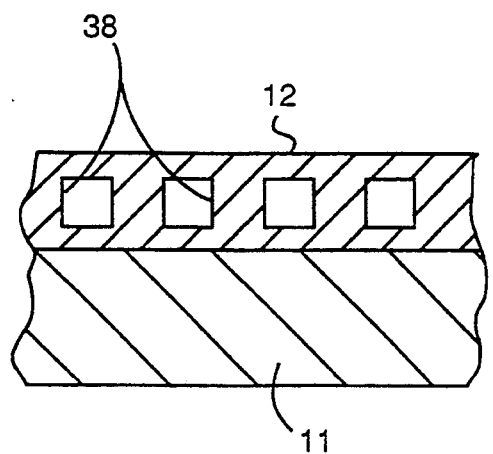
FIG. 5 is a greatly enlarged fragmentary view taken on line 5—5 of FIG. 4 showing the completed cooling channels after the filler has been removed from them.

The inner surface of the liner 12 is then machined to remove any excess of the filler material. The jacket and liner are then returned to the vacuum chamber 28 and the spraying continued as described above until an additional liner thickness of 0.05 to 0.15 cm has been achieved. This additional layer covers the filled slots 38. The mild steel 39 is then removed from the slots 38 to leave open cooling channels in the liner 12, as best shown in FIG. 5. With this, the combustion chamber is completed and ready for testing.

It can readily be seen that no welding is involved n making the combustion chamber itself. Thus, the risk of catastrophic failure is substantially reduced. Also, substantial savings are made in the time and expense required to make the combustion chamber.

What is claimed is:

1. A process for forming a combustion chamber for a liquid rocket engine, comprising
   a. providing a hollow metal jacket having an inner surface on which a liner is to be formed,
   b. projecting a stream of heated gas to impinge on the inner surface of the jacket,
   c. injecting an alloy in particle form into the gas stream to be carried into impact with the inner surface of the jacket, said particles being heated sufficiently in said gas stream that said particles flatten and adhere to previously deposited particles on the inner surface of the jacket to form a first layer, said injecting being continued until the first layer has a thickness of 0.6 to 1.5 cm,
   d. cutting cooling slots in said first layer,
   e. filling the cooling slots with a filler material,
   f. repeating steps b. and c. for a time sufficient to form a second layer adhered to the first layer and having a thickness of 0.05 to 0.15 cm, and
   g. removing the filler material from the slots to leave the slots open.

2. The process of claim 1 wherein the layers are deposited under a vacuum of 40 to 200 torr.

3. The process of claim 2 wherein the gas is heated to 5,000 to 20,000K.

4. The process of claim 3 wherein the gas stream is moving at a velocity of Mach 2 to Mach 3.

5. A process for forming a combustion chamber for a liquid rocket engine, comprising
   a. providing a hollow metal jacket having an inner surface on which a liner is to be formed,
   b. projecting a stream of a heated carrier gas at a velocity of Mach 2 to Mach 3 to impinge the gas stream on the inner surface of the jacket, said gas stream being heated to the temperature of 5,000 to 20,000 degrees K, said projecting being done under a vacuum of 40 to 200 torr.
   c. injecting into the gas stream an alloy in particle form having a particle size of 5 to 45 microns, said particles being in the gas stream for a sufficient length of time to heat said particles to a temperature sufficient to soften the particles sufficiently that said particles will flatten and adhere to previously deposited particles but will not spatter upon impact with the jacket,
   d. moving the gas stream inside the hollow jacket to form a first layer having a uniform thickness of 0.6 to 1.5 cm,
   e. cutting slots in said layer to form cooling channels,
   f. filling the slots with a filling material,
   g. repeating steps b and c to form a second layer adhered to the first layer and covering the filled slots to a depth of 0.05 to 0.15 cm, and
   h. removing the filling material from the slots to leave open cooling channels.

6. The method of claim 1 wherein the alloy is selected from the group consisting of (a) an alloy of 3.2 to 3.7 weight percent silver and 96.3 to 96.8 weight percent copper and (b) 2.75 to 3.25 weight percent silver, 0.30 to 0.7 weight percent zirconium with the balance being copper.

7. The method of claim 6 wherein the jacket is made from an alloy selected from the group consisting of (a) 50-55 weight percent nickel, 17-21 weight percent chromium, 4.75-5.5 weight percent niobium+tantalum, 2.8-3.3 weight percent molybdenum, 0.85-1.15 weight percent titanium, 0.2-0.8 weight percent aluminum with the balance being iron, (b) 9-13 weight percent nickel, 17-19 weight percent chromium, 0.8 weight percent niobium+tantalum with the balance being iron and (c) 29-31 weight percent nickel, 14-16 weight percent chromium, 1-1.5 weight percent molybdenum, 2.1-2.5 weight percent titanium, 0.1 to 0.35 weight percent aluminum with the balance being iron.

8. The process of claim 6 wherein the gas is 80-100% argon with up to 20% of helium or hydrogen.

* * * * *